United States Patent
Lee

(10) Patent No.: US 9,479,969 B2
(45) Date of Patent: Oct. 25, 2016

(54) SYSTEM AND METHOD FOR HANDOFF IN AN INTEGRATED CELL

(75) Inventor: Ki-Ho Lee, Kyunggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 355 days.

(21) Appl. No.: 13/166,314

(22) Filed: Jun. 22, 2011

(65) Prior Publication Data

US 2011/0319083 A1    Dec. 29, 2011

(30) Foreign Application Priority Data

Jun. 28, 2010    (KR) ........................ 10-2010-0061276

(51) Int. Cl.
*H04W 36/00*    (2009.01)
*H04W 84/04*    (2009.01)

(52) U.S. Cl.
CPC ........... *H04W 36/00* (2013.01); *H04W 84/045* (2013.01)

(58) Field of Classification Search
CPC . H04W 36/00; H04W 84/045; H04W 88/06; H04W 24/02; H04W 72/085; H04W 36/14; H04W 40/20; H04W 92/20; H04B 7/0404
USPC ........ 370/331, 332; 455/436, 437, 438, 439, 455/442, 443, 444
See application file for complete search history.

(56) References Cited

U.S. PATENT DOCUMENTS

| | | |
|---|---|---|
| 7,796,514 B2 | 9/2010 | Noriega |
| 2006/0178153 A1 | 8/2006 | Tenny et al. |
| 2009/0168676 A1* | 7/2009 | Olson ........................... 370/311 |
| 2009/0238143 A1 | 9/2009 | Mukherjee et al. |
| 2010/0008324 A1 | 1/2010 | Lee et al. |
| 2010/0015978 A1 | 1/2010 | Yoon et al. |
| 2010/0075679 A1 | 3/2010 | Tenny et al. |
| 2010/0124179 A1* | 5/2010 | Lee et al. ...................... 370/252 |
| 2010/0257188 A1 | 10/2010 | Kim et al. |
| 2011/0013560 A1 | 1/2011 | Zhang et al. |
| 2011/0092214 A1 | 4/2011 | Iwamura |
| 2011/0212724 A1* | 9/2011 | Wirtanen et al. .......... 455/435.2 |
| 2012/0014350 A1 | 1/2012 | Kim et al. |

FOREIGN PATENT DOCUMENTS

| | | |
|---|---|---|
| KR | 10-2005-0068400 A | 7/2005 |
| KR | 10-2005-0121136 A | 12/2005 |
| KR | 10-2007-0110348 A | 11/2007 |
| KR | 10-2008-0026855 A | 3/2008 |

(Continued)

*Primary Examiner* — George Eng
*Assistant Examiner* — Jing Gao
(74) *Attorney, Agent, or Firm* — IP Legal Services, LLC

(57) ABSTRACT

A system and method for handoff in an integrated cell. A user equipment selects an integrated cell as a target cell supporting a target network based on a white list and physical cell identities. A cell-to-cell handoff is performed to the target cell. After the cell-to-cell handoff, a base station of the target cell establishes a communication session directly to a service. Then, the user equipment determines whether or not a physical cell identity of a base station of the target cell is an integrated physical cell identity. The user equipment turns on a module for the target network when the physical cell identity of the base station is determined to be the integrated physical cell identity. A heterogeneous-network handoff is then performed, and the base station communicates directly with a service server using a mapping table in order to seamlessly provide the service to the user equipment.

20 Claims, 4 Drawing Sheets

(56) References Cited

FOREIGN PATENT DOCUMENTS

| | | |
|---|---|---|
| KR | 10-2008-0080801 A | 9/2008 |
| KR | 10-2009-0064285 A | 6/2009 |
| KR | 10-2009-0100000 A | 9/2009 |
| KR | 10-0920894 B1 | 10/2009 |
| KR | 10-2010-0003664 A | 1/2010 |
| KR | 10-2010-0004833 A | 1/2010 |
| KR | 10-2010-0021156 A | 2/2010 |
| KR | 10-2010-0029869 A | 3/2010 |
| KR | 10-2010-0056116 A | 5/2010 |
| KR | 10-2010-0060353 A | 6/2010 |
| KR | 10-2010-0092742 A | 8/2010 |
| KR | 10-2010-0126776 A | 12/2010 |
| KR | 10-2010-0126818 A | 12/2010 |
| KR | 10-2010-0133821 A | 12/2010 |
| KR | 10-2011-0099327 A | 9/2011 |
| WO | WO 2009078573 A2 * | 6/2009 |

* cited by examiner

SYSTEM AND METHOD FOR HANDOFF IN AN INTEGRATED CELL

CROSS REFERENCE TO PRIOR APPLICATIONS

The present application claims priority under 35 U.S.C. §119 to Korean Patent Application No. 10-2010-0061276 (filed on Jun. 28, 2010), which is hereby incorporated by reference in its entirety.

FIELD OF THE INVENTION

Apparatuses and methods consistent with the present invention relate to handoff within an integrated cell and particularly, to handoff within an integrated femtocell and seamlessly providing a service.

BACKGROUND OF THE INVENTION

A femtocell is a small cellular base station that provides a mobile communication service in a comparatively narrow area. The femtocell has various advantages of expanding indoor service coverage, improving a service quality, and effectively providing various wired and wireless integrated services. In addition, the femtocell has low installation and maintenance fees. Further, the femtocell can be installed in any location where an Internet channel is available.

Due to such advantages of the femtocell, the femtocell has been receiving greater attention lately. Advances in the femtocell have lead to development of an integrated femtocell. The integrated femtocell supports heterogeneous networks such as a mobile network and a wireless data network. In order to provide a service seamlessly to a user in such an integrated femtocell, there is a need for developing a method for effectively performing handoff in the integrated femtocell.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a modulator-demodulator (MODEM) for a second network is turned on after a cell-to-cell handoff is performed to a target cell supporting the second network.

In accordance with another aspect of the present invention, a predetermined service is seamlessly provided to user equipment using a mapping table.

In accordance with an embodiment of the present invention, a handoff in a target cell supporting heterogeneous networks is performed. A cell-to-cell handoff in a communication system from a current cell supporting a first network to the target cell supporting the first network and a second network may be executed. After the cell-to-cell handoff, a communication session may be established with a service server for providing a service. Then, a network module may be initiated for establishing a communication session with the second network. A heterogeneous-network handoff within the target cell may be executed from the first network to the second network. The service server may be directly communicated with through the established communication session by using a mapping table, to seamlessly provide the service.

In accordance with embodiments of the present invention, the target cell may be selected based on a white list and physical cell identities received from neighboring cells. At least one cell in the communication system having associated therewith an integrated physical cell identity as its physical cell identity may be determined to support the first and second networks. The integrated physical cell identity may be a subset of the physical cell identities and reserved for indicating an integrated cell supporting a plurality of network types, and a respective integrated physical cell identity may be allocated to each base station of corresponding integrated cells.

In accordance with embodiments of the present invention, after executing said cell-to-cell handoff, a determination may be made as to whether a physical cell identity associated with the target cell is an integrated physical cell identity. The network module may be initiated when the physical cell identity associated with the target cell is the integrated physical cell identity.

In accordance with embodiments of the present invention, a first IP address for the service may be allocated to a user equipment prior to execution of the heterogeneous-network handoff. Then, a second IP address for the service may be allocated after execution of the heterogeneous-network handoff. After the cell-to-cell handoff, the service may be received directly from the service server through the communication session without utilizing an associated service proxy server. A base station of the target cell may recognize the first IP address of the user equipment, by using the mapping table, after the second IP address is allocated in place of the first IP address due to the heterogeneous-network handoff, and transfer service packets for the service directly to the service server by using the recognized first IP address.

In accordance with embodiments of the present invention, the mapping table may include an integrated physical cell identity field, a first network information field, and a second network information field. The integrated physical cell identity field may be configured to store an integrated physical cell identity of a corresponding base station. The first network information field may be configured to store information on the first network. The second network information field may be configured to store information on the second network. The first network information field may further be configured to store a first IP address assigned to a user equipment prior to the heterogeneous-network handoff. The second network information field may further be configured to store a second IP address assigned to the user equipment after the heterogeneous-network handoff.

In accordance with embodiments of the present invention, the service may be a voice over Internet Protocol (VoIP) service and the service server may be a VoIP server. The first network may be a mobile network and the second network may be a wireless data network In accordance with another embodiment of the present invention, handoff in a cell supporting heterogeneous networks and within which a user equipment is located is performed. In embodiments of the present invention, a service is provided to the user equipment through a service server, the service being provided during a communication session between the service server and the user equipment. A heterogeneous-network handoff within the cell of the communication session from a first network to a second network may then be executed. The service server may be communicated with directly through the communication session by using a mapping table. A base station of the cell may be configured to recognize, by using the mapping table, a first IP address allocated to the user equipment for the service prior to execution of the heterogeneous-network handoff, after a second IP address is allocated to the user equipment for the service in place of the first IP address due to the heterogeneous-network handoff, and communicate directly with the service server by using the recognized first IP address.

In accordance with further another embodiment of the present invention, a system performs a handoff in a target cell supporting heterogeneous networks. In embodiments of the present invention, the system includes a user equipment and a base station. The user equipment may be configured to perform a cell-to-cell handoff in a communication system from a current cell supporting a first network to the target cell supporting the first network and a second network, to initiate a network module for establishing access with the second network, and to execute a heterogeneous-network handoff within the target cell from the first network to the second network. The base station may be configured to establish a communication session with a service server for providing a service to the user equipment, to communicate directly with the service server through the established communication session by using a mapping table.

In accordance with embodiments of the present invention, the user equipment may receive physical cell identities from neighboring cells, maintain a white list having information of the neighboring cells and their respective physical cell identities, and select the target cell based on the received physical cell identities. After the cell-to-cell handoff, the user equipment may determine whether a physical cell identity of a base station of the target cell is an integrated physical cell identity. The integrated physical cell identity may indicate that the base station of the target cell supports the first network and the second network. The integrated physical cell identity may be a subset of the physical cell identities and may be reserved for indicating an integrated cell supporting a plurality of network types. A respective integrated physical cell identity may be allocated to each base station of integrated cells.

In accordance with embodiments of the present invention, a base station of the target cell may have functions of a service proxy server and may include the mapping table. The user equipment may be allocated with a first IP address for the service prior to execution of the heterogeneous-network handoff and the user equipment may be allocated with a second IP address for the service after execution of the heterogeneous-network handoff. The user equipment may receive, after the cell-to-cell handoff, the service directly from the service server through the communication session without utilizing an associated service proxy server. The base station of the target cell may recognize the first IP address of the user equipment, by using the mapping table, after the second IP address is allocated in place of the first IP address due to the heterogeneous-network handoff, and transfer service packets for the service directly to the service server by using the recognized first IP address.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
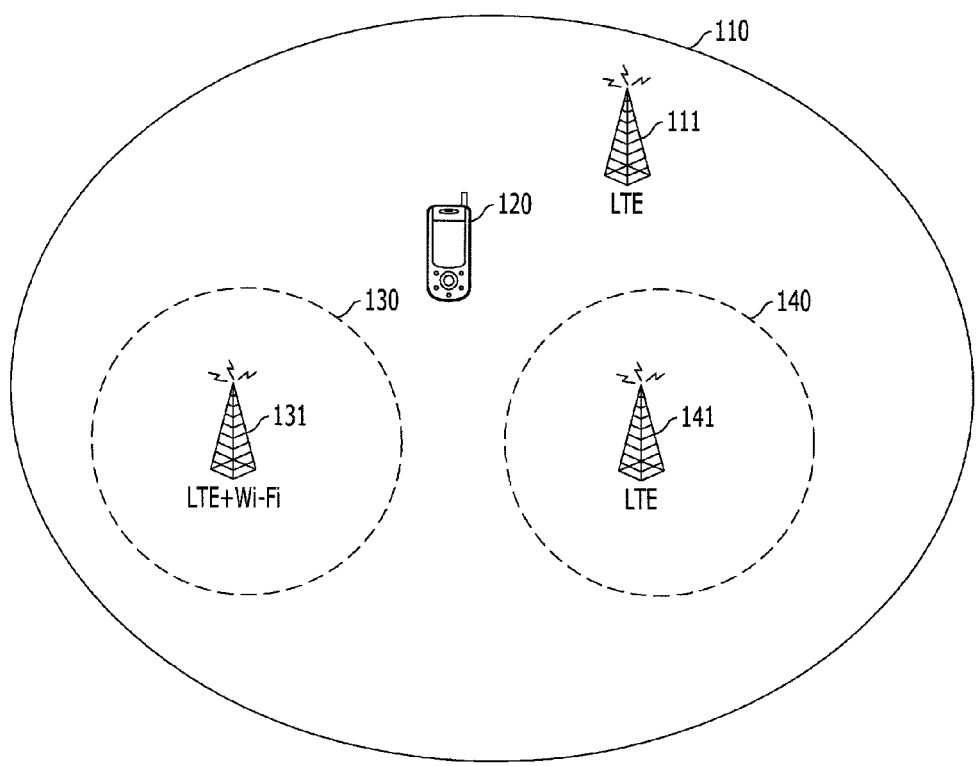
FIG. 1 illustrates a network environment for describing a system for handoff in an integrated cell, in accordance with an embodiment of the present invention.

Reference will now be made in detail to embodiments of the present invention, examples of which are illustrated in the accompanying drawings, wherein like reference numerals refer to like elements throughout. The embodiments are described below in order to explain the present invention by referring to the figures as examples.

FIG. 1 illustrates a network environment for describing a system for handoff in an integrated cell, in accordance with an embodiment of the present invention.

The network environment may include a plurality of cells. Each cell may support homogeneous networks or heterogeneous networks. Particularly, a cell supporting heterogeneous networks may be referred to as an integrated cell. One cell may be overlapped with a plurality of other cells. For example, as illustrated in FIG. 1, a macrocell 110 may be overlapped with first and second femtocells 130 and 140. However, the macrocell 110 and the first and second femtocells 130 and 140 are illustrated in FIG. 1 as having the particular configuration illustrated as an example only, and the present invention in not limited thereto. A system in accordance with an embodiment of the present invention may include any type of cells in any configuration. For example, an integrated cell may be one of a macrocell, a femtocell, a microcell, and a picocell, but is not limited thereto. Furthermore, other cells in the system may each be one of a macrocell, a femtocell, a microcell, and a picocell, but are not limited thereto. For clarity of explanation, an integrated cell has been embodied in an embodiment of the present invention as a first femtocell 130, as illustrated in FIG. 1. However, it is understood by one of ordinary skill in the art that the integrated cell may be any type of communication network cell.

The macrocell 110 may provide radio coverage served by a high power macrocell base station 111. A macrocell may typically provide coverage larger than a microcell and a femtocell. For example, the macrocell 110 may provide a coverage range of about 20 Km. The macrocell 110 may support a long term evolution (LTE) network, and the macrocell base station 111 may be an LTE cellular base station.

The first and second femtocells 130 and 140 may be located inside the macrocell 110, as illustrated in FIG. 1. The first and second femtocells 130 and 140 may provide radio coverage smaller than the macrocell 110. The first femtocell 130 may be an integrated femtocell supporting heterogeneous networks, for example, both an LTE network and a Wi-Fi network. The second femtocell 140 may be a femtocell supporting homogeneous networks, for example, an LTE network or a Wi-Fi network.

Although the macrocell 110 and the first and second femtocells 130 and 140 are illustrated as supporting the LTE network and the first femtocell 130 is illustrated as also supporting the Wi-Fi network, the present invention is not limited thereto. Embodiments of the present invention may be applied to any mobile network and wireless data network. The mobile network may be, for example, a third generation mobile network including a wideband code division multiple access (WCDMA) network. The wireless data network may be any of a Wi-Fi network, a WiMAX network, and a WiBro network.

In such a network environment, a system for handoff in an integrated cell in accordance with embodiments of the present invention performs a cell-to-cell handoff to a target integrated cell that supports a target network. After the cell-to-cell handoff, the system turns on a module for establishing a communication session to the target network and performs a heterogeneous-network handoff within the target integrated cell from a current network to the target network. After the heterogeneous-network handoff, the system directly communicates with a service server without passing through a service proxy server.

In accordance with embodiments of the present invention, the system may include an integrated femtocell base station 131 and user equipment (UE) 120, as illustrated in FIG. 1. The user equipment 120 may include a plurality of MODEMs for supporting heterogeneous networks. For example, the user equipment 120 may include an LTE MODEM for an LTE network and a Wi-Fi MODEM for a Wi-Fi network.

The user equipment 120 may perform a cell-to-cell handoff from a current cell to a target cell that supports a target network based on a white list and physical cell identities. For example, in the embodiment of the invention as illustrated in FIG. 1, the current cell may be the macrocell 110 and the target cell may be the first femtocell 130. The user equipment 120 may store a white list and receive physical cell identities broadcasted from neighboring cell(s).

The white list may include a list of neighboring cells and information thereof. The user equipment 120 may store and update the white list based on information received from the macrocell base station 111.

The physical cell identity (PCI) is a unique number assigned to each base station of each cell. For example, integer values from 0 to 503 may be used as PCIs. In an embodiment of the present invention, a subset of the PCIs may be reserved for indicating integrated base stations and allocated to each integrated base station. For example, PCIs from 100 to 200 may be reserved as integrated PCIs, and one of the reserved integrated PCIs may be allocated to each integrated base station. Referring to FIG. 1, the first femtocell 130 is an integrated femtocell supporting heterogeneous networks, and thus the integrated femtocell base station 131 of the first femtocell 130 may be assigned with an integrated PCI. The macrocell base station 111 and the femtocell base station 141 are not integrated base stations, and thus are assigned PCIs that are not the integrated PCIs.

Particularly, the user equipment 120 may perform the cell-to-cell handoff from the macrocell 110 to the first femtocell 130 supporting a Wi-Fi network as illustrated in FIG. 1. In order to handoff to a target cell supporting a desired network such as the Wi-Fi network, the user equipment 120 may use a white list and PCIs received from the first and second femtocells 130 and 140. In this case, the white list may be a list of the first and second femtocells 130 and 140 and information thereof, and the user equipment 120 may receive an integrated PCI from the first femtocell 130 and a PCI from the second femtocell 140. The user equipment 120 may store and update the white list based on information provided from a macrocell base station 111 of the macrocell 110. The user equipment 120 may receive PCIs broadcasted from the neighboring femtocells 130 and 140. The user equipment may select the first femtocell 130 as the target cell, based on the white list and an integrated PCI of the integrated femtocell base station 131.

Furthermore, the user equipment 120 may perform a heterogeneous-network handoff from a current network to the desired network that the target cell supports. In an embodiment of the present invention, the user equipment 120 may determine whether the target cell is an integrated cell or not based on a PCI of the base station within the target cell. When the PCI of the base station of the target cell is an integrated PCI, the user equipment 120 may turn on a corresponding module for the desired network. For example, the user equipment 120 may turn on a Wi-Fi modulator-demodulator (MODEM) for forming a communication session in the Wi-Fi network after the cell-to-cell handoff. Since the user equipment 120 turns on the Wi-Fi MODEM only when necessary, the power consumption thereof can be reduced significantly.

The integrated femtocell base station 131 may be an access point for the first femtocell 130. The integrated femtocell base station 131 supports communication sessions for heterogeneous networks. For example, the integrated femtocell base station 131 may support communication sessions for the LTE network and the Wi-Fi network, as illustrated in FIG. 1.

In accordance with an embodiment of the present invention, the integrated femtocell base station 131 may include functions of an e-Node B and a service proxy server. Accordingly, the integrated femtocell base station 131 can communicate directly with a service server without passing through a service proxy server. For example, the integrated femtocell base station 131 may perform functions of a voice over IP (VoIP) proxy server. In this case, the integrated femtocell base station 131 may directly transmit VoIP packets to a VoIP server without passing through a VoIP proxy server. Since the integrated femtocell base station 131 may include the functions of the VoIP proxy server, the integrated femtocell base station 131 can seamlessly provide a VoIP service to the user equipment 120 after the heterogeneous-network handoff from the LTE network to the Wi-Fi network.

One of ordinary skill in the art would recognize that the functions of the e-Node B and the service proxy server can be easily integrated and implemented as software or hardware in an integrated femtocell base station when a network is installed. Accordingly, further detailed description thereof is omitted herein. The functions and constituent elements of the integrated femtocell base station will be described in more detail with reference to FIG. 5.

Figure 2:
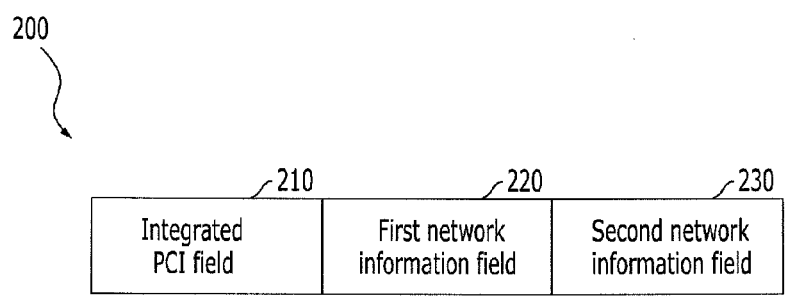
FIG. 2 illustrates a mapping table in accordance with an embodiment of the present invention.

Furthermore, the integrated femtocell base station 131 in accordance with an embodiment of the present invention may include a mapping table 200, as illustrated in FIG. 2. The integrated femtocell base station 131 may use the mapping table 200 to seamlessly provide a service to the user equipment 120. Particularly, the integrated femtocell base station 131 may recognize from the mapping table 200 an IP address assigned to the user equipment 120 with which the service was received before the heterogeneous-network handoff. Since the integrated femtocell base station 131 has the functions of a proxy server, the integrated femtocell base station 131 may seamlessly provide the predetermined service after the heterogeneous-network handoff when the integrated femtocell base station 131 recognizes the IP address assigned to the user equipment 120 prior to the heterogeneous-network handoff. The mapping table 200 will be described in more detail with reference to FIG. 2.

FIG. 2 illustrates a mapping table 200 in accordance with embodiments of the present invention. The mapping table 200 may indicate a mapping-relation between integrated PCIs allocated to corresponding base stations and information on a plurality of heterogeneous networks that the corresponding base stations support.

Referring to FIG. 2, the mapping table 200 in accordance with embodiments of the present invention may include an integrated PCI field 210, a first network information field 220, and a second network information field 230. Although the mapping table 200 of FIG. 2 includes two network information fields 220 and 230, the present invention is not limited thereto. The mapping table 200 may have more than two network information fields.

The integrated PCI field 210 may include an integrated PCI allocated to a corresponding integrated base station. The integrated PCI is one of reserved PCIs for indicating an integrated base station of an integrated cell. For example, the integrated femtocell base station 131 may be assigned with an integrated PCI #100.

The first and second network information fields 220 and 230 may include information on a first network and a second network that the integrated base station supports. For example, when the integrated femtocell base station 131 assigned with the integrated PCI #100 supports two heterogeneous networks, that is, a Wi-Fi network and an LTE network, the first network information field 220 includes information on the Wi-Fi network and the second network information field 230 includes information on the LTE network. Particularly, the Wi-Fi information 220 may include an $IP_{Wi\text{-}Fi}$ and the LTE information 230 may include an $IP_{LTE}$. The $IP_{LTE}$ may be an IP address allocated to the user equipment 120 for the LTE network before the heterogeneous-network handoff and the $IP_{Wi\text{-}Fi}$ may be an IP address allocated to the user equipment 120 for the Wi-Fi network after the heterogeneous-network handoff.

In general, an IP address assigned to user equipment may be changed after the heterogeneous-network handoff. For example, the $IP_{LTE}$ may be changed to the $IP_{Wi\text{-}Fi}$. Since the IP address is changed, a service provided to the user equipment may be interrupted. In order to seamlessly provide the service, a related proxy server needs to recognize an initial IP address assigned to the user equipment for the service even though the initial IP address has been changed due to the handoff.

In accordance with embodiments of the present invention, the integrated femtocell base station 131 may recognize, using the mapping table 200, an initial IP address such as the $IP_{LTE}$, assigned to the user equipment 120 before the heterogeneous-network handoff. Since the integrated femtocell base station 131 has functions of a VoIP proxy server and thus recognizes, using the mapping table 200, the initial IP address assigned to the user equipment 120, the integrated femtocell base station 131 can seamlessly provide a VoIP service to the user equipment 120 after the heterogeneous-network handoff.

Figure 3:
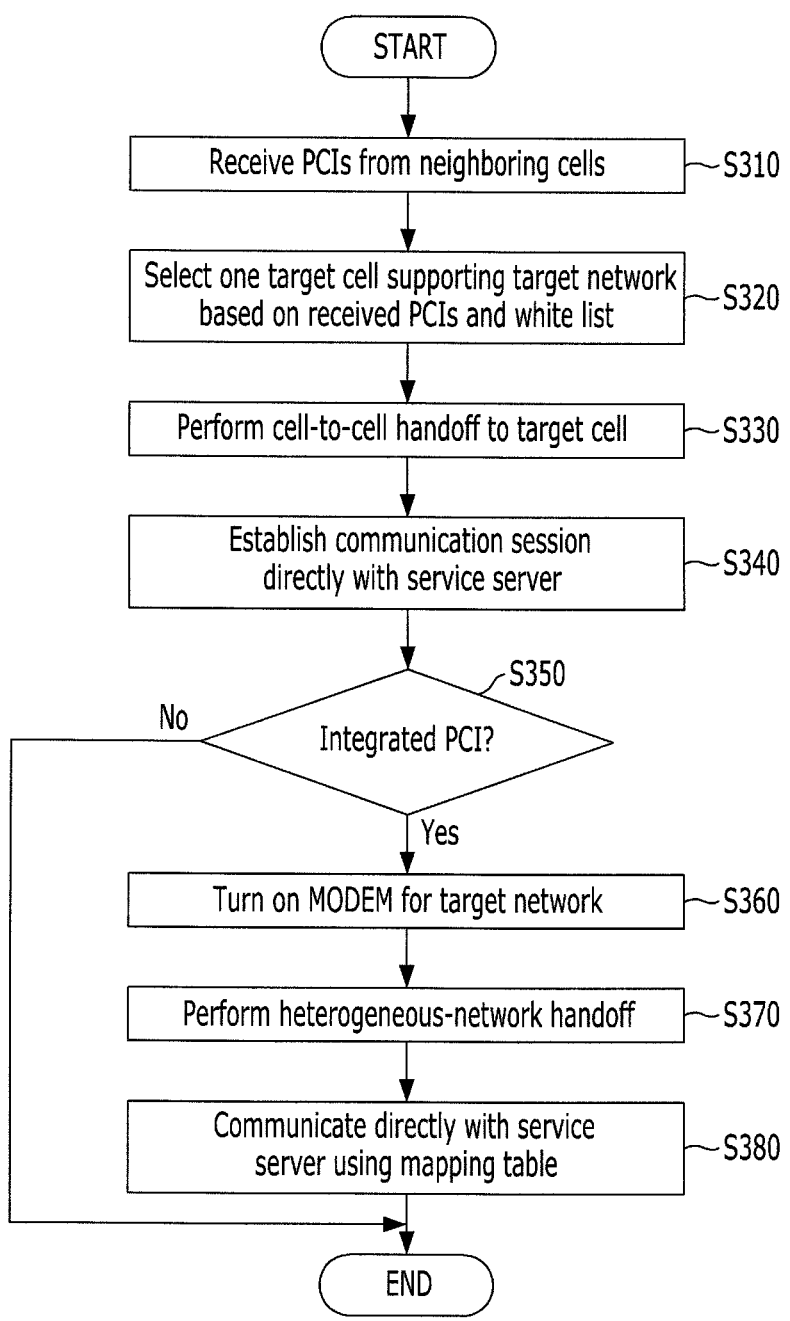
FIG. 3 illustrates a method for handoff in an integrated femtocell supporting heterogeneous networks, in accordance with an embodiment of the present invention.

FIG. 3 illustrates a method for handoff in an integrated cell supporting heterogeneous networks, in accordance with an embodiment of the present invention.

In accordance with embodiments of the present invention, one of the neighboring integrated cells that supports a target network may be selected based on a white list and PCIs received from the neighboring integrated cells, and a cell-to-cell handoff may be performed to the selected integrated cell. After the cell-to-cell handoff, a MODEM for the target network may be automatically turned on and a heterogeneous-network handoff may be performed. Furthermore, after the cell-to-cell handoff, a communication session may be directly formed from the integrated cell to a corresponding service server, and a service may be provided seamlessly using a mapping table. The method in accordance with an embodiment of the present invention will be described in more detail with reference to FIG. 1 and FIG. 3.

As illustrated in FIG. 3, PCIs may be received from neighboring cells in a white list S310. For example, the user equipment 120 may receive PCIs broadcasted from the integrated femtocell base station 131 and the femtocell base station 141, which are included in the white list of the user equipment 120.

One of the neighboring cells that supports a target network is selected as a target cell based on the white list and the received PCIs S320. For example, the user equipment 120 may inform the macrocell base station 111 of the received PCIs from the integrated femtocell base station 131 and the femtocell base station 141. This informing by the user equipment 120 may be referred to as a measurement report. The macrocell base station 111 may select the first femtocell 130 as the target cell based on the measurement report from the user equipment 120.

A cell-to-cell handoff is performed to the selected target cell S330. For example, the user equipment 120 may perform a handoff to the first femtocell 130 as the target cell. For the cell-to-cell handoff, the macrocell base station 111 may transmit a handoff request to the integrated femtocell base station 131. The integrated femtocell base station 131 may send a handoff response to the macrocell base station 111, and the macrocell base station 111 may transmit a handoff instruction to the user equipment 120.

After the cell-to-cell handoff, a communication session may be established directly to a service server S340. For example, the integrated femtocell base station 131 may establish a communication session directly with a VoIP server without passing through a VoIP proxy server. As described above, the integrated femtocell base station 131 in accordance with an embodiment of the present invention may include functions of a VoIP proxy server. Accordingly, the integrated femtocell base station can directly communicate with the VoIP server.

A determination may be made as to whether or not a PCI of the base station of the target cell is an integrated PCI S350. For example, the user equipment 120 may determine whether or not the PCI of the integrated femtocell base station 131 is an integrated PCI.

As illustrated in FIG. 3, the determination of whether the PCI of the target cell is an integrated PCI S350 may be performed after the cell-to-cell handoff. The present invention, however, is not limited thereto. This determination S350 may be performed before the cell-to-cell handoff. In addition, the determination S350 may be performed during the selection of the target cell S320.

When the PCI of the base station of the target cell is the integrated PCI (S350—Yes), a MODEM or module for a target network may be turned on and form a communication session with the target network S360. For example, the user equipment 120 may turn on a Wi-Fi MODEM after the cell-to-cell handoff to the first femtocell 130 supporting an LTE network and a Wi-Fi network.

After turning on the target network MODEM, a heterogeneous-network handoff may be performed S370. For example, the user equipment 120 may form a Wi-Fi channel to the Wi-Fi network supported by the integrated femtocell base station 131 and transfer data through the Wi-Fi channel. In an embodiment of the present invention, a Wi-Fi network may be assigned with a higher priority than an LTE network when an integrated femtocell supports an LTE network and a Wi-Fi network. In this case, the user equipment 120 may access the Wi-Fi network supported by the integrated femtocell base station 131 and form the Wi-Fi channel when the user equipment 120 enters the first femtocell 130. After forming the Wi-Fi channel, the user equipment 120 may exchange data with the integrated femtocell base station 131 through the Wi-Fi channel even though the femtocell base station uses an LTE network to communicate with a server in other cells or in an upper layer. The present invention, however, is not limited thereto, and one of ordinary skill in the art would recognize that priorities may be assigned to heterogeneous networks through various methods.

After the heterogeneous-network handoff, a service may be seamlessly provided by communicating directly with the related service server using a mapping table S380. For example, by using the mapping table 200, the integrated femtocell base station 131 may transfer packets for a VoIP call directly to the VoIP server without passing through the VoIP proxy server. In an embodiment of the present invention, the integrated femtocell base station 131 may include functions of a VoIP proxy server, and by using the mapping table 200, recognize an initial IP address such as $IP_{LTE}$, assigned to the user equipment 120 for the VoIP call. Accordingly, the integrated femtocell base station 131 can deliver VoIP packets directly to the VoIP server. A handoff in a heterogeneous network in which a service is seamlessly provided will be described in more detail with reference to FIG. 4.

As described above, in accordance with an embodiment of the present invention, user equipment may turn on a MODEM for a target network having a higher priority only when the user equipment enters an integrated cell supporting the target network. Accordingly, the handoff method in accordance with an embodiment of the present invention can reduce power consumption of user equipment advantageously.

For example, in the case of user equipment supporting dual modes or a plurality of modes including a Wi-Fi mode and an LTE mode, the user equipment may turn on the Wi-Fi mode only when the user equipment enters an integrated cell supporting a Wi-Fi network. Accordingly, the user equipment can reduce power consumption thereof, and battery lifespan can be extended. Furthermore, since the user equipment may automatically access a Wi-Fi network when the user equipment enters an integrated cell that supports both an LTE network and a Wi-Fi network, use convenience is improved.

Figure 4:
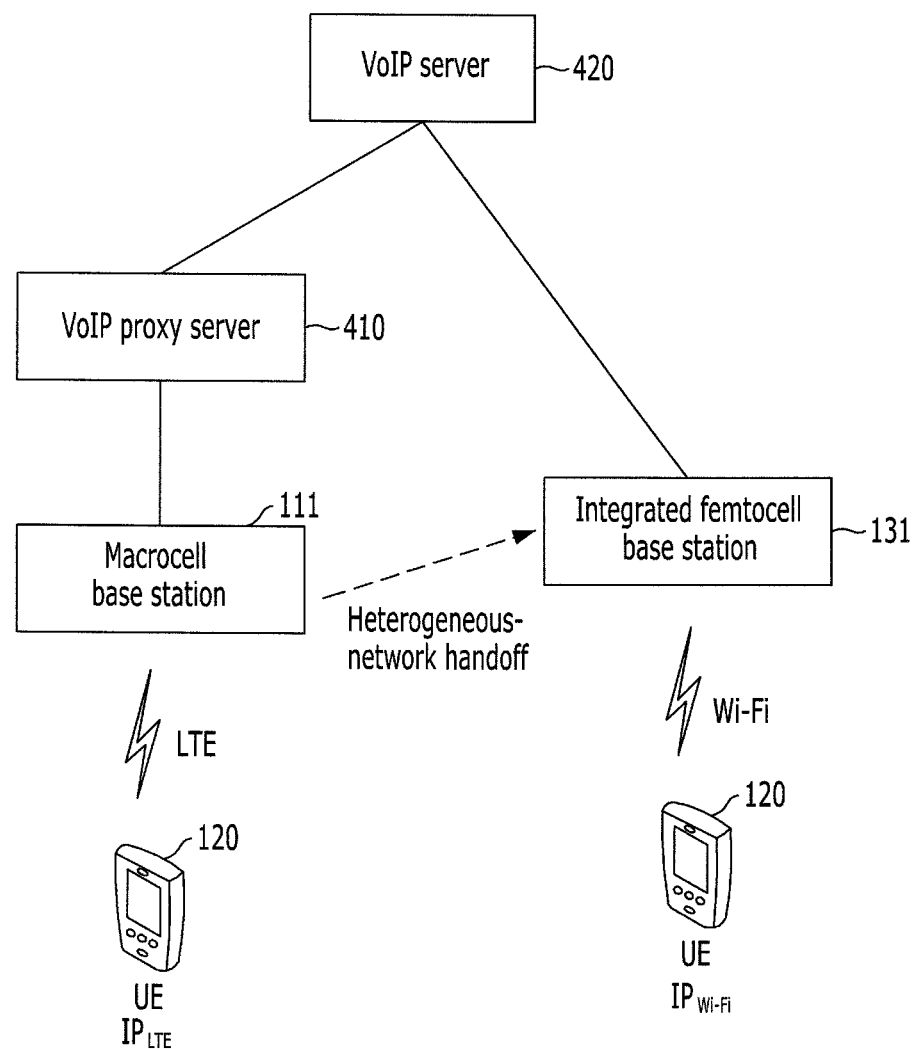
FIG. 4 illustrates a handoff in a heterogeneous network in which a service is seamlessly provided, in accordance with an embodiment of the present invention.

FIG. 4 illustrates a handoff in a heterogeneous network in which a service is seamlessly provided, in accordance with an embodiment of the present invention.

In the related art, services are interrupted after performing a heterogeneous-network handoff. The interruption may occur because an initial IP address assigned to user equipment for using a service is changed after the heterogeneous-network handoff. In order to overcome such a problem, an integrated cell, such as the integrated femtocell base station 131 in accordance with an embodiment of the present invention, includes the mapping table 200 and functions of a proxy server. For example, the integrated femtocell base station 131, by using the mapping table 200, may recognize the initial IP address such as $IP_{LTE}$ even though the initial IP address is changed after the heterogeneous-network handoff.

The user equipment 120 may be assigned with an $IP_{LTE}$ for receiving and transmitting packets for a VoIP call through an LTE network before the heterogeneous-network handoff, as illustrated in FIG. 4. The macrocell base station 111 may transfer data for the VoIP call to a VoIP server 420 through a VoIP proxy server 410 because base stations such as the macrocell base station 111 do not typically include functions of a VoIP proxy server and the mapping table 200.

After the heterogeneous-network handoff, the user equipment 120 may be newly assigned with an $IP_{Wi-Fi}$ in order to transmit and receive packets for a VoIP call through a Wi-Fi network as illustrated in FIG. 4. In an embodiment of the present invention, the integrated femtocell base station 131 may store such IP changes in the mapping table 200. Using the mapping table 200, the integrated femtocell base station 131 may recognize an initial IP address, such as $IP_{LTE}$, assigned before the heterogeneous-network handoff. Accordingly, the integrated femtocell base station 131 can provide a service seamlessly even though the initial IP address is changed to an $IP_{Wi-Fi}$ after the heterogeneous-network handoff. Furthermore, the integrated femtocell base station 131 may include functions of a VoIP proxy server. The integrated femtocell base station 131 can thus directly communicate with the VoIP server 420 without requiring a VoIP proxy server. The integrated femtocell base station 131 in accordance with an embodiment of the present invention will be described in more detail with reference to FIG. 5.

Figure 5:
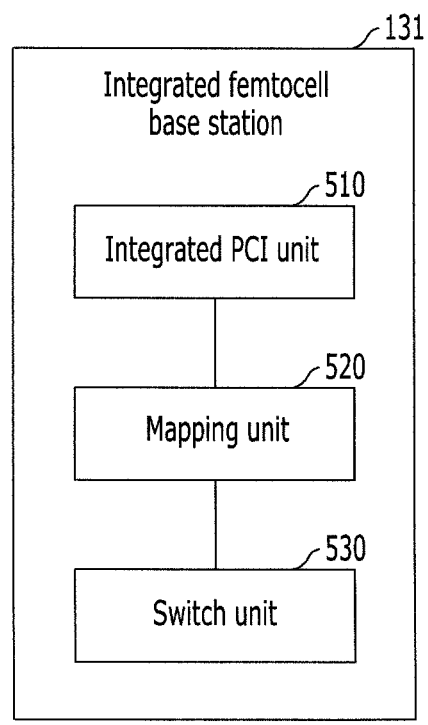
FIG. 5 illustrates an integrated femtocell base station in accordance with embodiments of the present invention.

FIG. 5 illustrates an integrated femtocell base station 131 in accordance with an embodiment of the present invention.

As described above, the integrated femtocell base station 131 may be installed within a corresponding integrated femtocell (e.g., the first femtocell 130) and controls communication with the user equipment 120 through heterogeneous networks such as an LTE access network and a Wi-Fi network. Furthermore, the integrated femtocell base station 131 may seamlessly provide a service to the user equipment 120 after the heterogeneous-network handoff. Accordingly, the integrated femtocell base station 131 may include functions of an e-Node B and a service proxy server. The femtocell base station base station 131 may also perform a packet switching function for a mobile network. Particularly, the integrated femtocell base station 131 may perform functions of a VoIP proxy server and the mapping table 200. Accordingly, even though the $IP_{LTE}$ may be changed to $IP_{Wi-Fi}$ due to the heterogeneous-network handoff, by using the mapping table 200 the integrated femtocell base station 131 can send VoIP packets directly to the VoIP server 420 without passing through a VoIP proxy server.

Referring to FIG. 5, the femtocell base station 131 in accordance with an embodiment of the present invention may include an integrated PCI unit 510, a mapping unit 520, and a switch unit 530.

The integrated PCI unit 510 may store an integrated PCI allocated to the integrated femtocell base station 131. As described above, the integrated PCI is one of reserved PCIs for indicating an integrated cell. For example, the integrated PCIs may be integer numbers from 100 to 200.

The mapping unit 520 may map the allocated integrated PCI to corresponding first network information and second network information. For example, the first network information may be information on a network used before a heterogeneous-network handoff, and the second network information may be information on a network used after the heterogeneous-network handoff. For example, in embodiments of the present invention as illustrated in FIGS. 1 and 4, the first network information may be LTE network information and the second network information may be Wi-Fi network information. The first network information may include an IP address assigned to user equipment before the heterogeneous-network handoff, and the second network information may include an IP address assigned to the user equipment after the heterogeneous-network handoff. The mapping unit 520 may incorporate the mapping table 200 of FIG. 2.

The switch unit 530 may switch the first network information to the corresponding second network information or the second network information to the first network information using the mapping unit 520. For example, the LTE information such as $IP_{LTE}$ may be exchanged for corresponding Wi-Fi information such as $IP_{Wi-Fi}$.

In embodiments of the present invention, user equipment may turn on a MODEM or modules for a target network only when the user equipment enters an integrated cell that supports the target network. Since the user equipment does not maintain turning on all of the MODEMs or modules for a plurality of heterogeneous networks, the power consumption of the user equipment can be reduced.

For example, in the case of a dual-mode user equipment supporting an LTE network and a Wi-Fi network, the user equipment turns on a MODEM or modules for the Wi-Fi network only when the user equipment enters an integrated cell supporting the Wi-Fi network. Accordingly, the power consumption of the user equipment can be reduced.

In embodiments of the present invention, a base station of an integrated cell may include functions of a VoIP proxy server and a mapping table. Accordingly, a service can be seamlessly provided after an initial IP address assigned to user equipment is changed due to the heterogeneous-network handoff.

The method for handoff in an integrated cell in accordance with embodiments of the present invention may be realized as a program and stored in a computer-readable recording medium such as a CD-ROM, a RAM, a ROM, floppy disks, hard disks, magneto-optical disks, and the like. Since the process can be easily implemented by those skilled in the art to which the present invention pertains, further description will not be provided herein.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for handoff in a target cell supporting heterogeneous networks, the method comprising:
    upon execution of a cell-to-cell handoff from a current cell of a first network to the target cell supporting the first network, determining whether the target cell supports heterogeneous networks including a second network based on a physical cell identity associated with the target cell;
    determining that the target cell supports heterogeneous networks including the second network when the physical cell identify of the target cell is an integrated physical cell identity, wherein the integrated physical cell identity indicates an integrated cell supporting a plurality of heterogeneous network types;
    turning on a network module for establishing a communication session with the second network only when the target cell supports heterogeneous network including the second network based on the determination;
    executing a heterogeneous-network handoff within the target cell from the first network to the second network; and
    establishing a communication session with a service server using a mapping table for seamlessly providing a service to the user equipment.

2. The method of claim 1, wherein the target cell is selected based on a white list and physical cell identities received from neighboring cells.

3. The method of claim 2, wherein at least one cell in a communication system having associated therewith an integrated physical cell identity as its physical cell identity is determined to support the first and second networks.

4. The method of claim 3, wherein:
    a respective integrated physical cell identity is allocated to each base station of corresponding integrated cells.

5. The method of claim 1, wherein the integrated physical cell identity indicates that a base station of the target cell supports the first network and the second network.

6. The method of claim 1, wherein the network module comprises a modulator-demodulator (MODEM) for the second network.

7. The method of claim 1, further comprising:
    upon the execution of the cell-to-cell handoff, establishing a communication session with the service server for providing a service through the first network of the target cell and communicating with the service server through an associated service proxy server by allocating a first IP address for the service to a user equipment prior to execution of the heterogeneous-network handoff; and
    upon the execution of the heterogeneous-network handoff within the target cell, communicating with and receiving the service directly from the service server through the second network without utilizing the associated service proxy server by allocating a second IP address for the service after execution of the heterogeneous-network handoff,
    wherein a base station of the target cell recognizes the first IP address of the user equipment, by using the mapping table, after the second IP address is allocated in place of the first IP address due to the heterogeneous-network handoff, and transfers service packets for the service directly to the service server by using the recognized first IP address.

8. The method of claim 1, wherein the mapping table comprises:
    an integrated physical cell identity field that is configured to store an integrated physical cell identity of a corresponding base station;
    a first network information field that is configured to store information on the first network; and
    a second network information field that is configured to store information on the second network.

9. The method of claim 8, wherein:
    the first network information field is configured to store a first IP address assigned to a user equipment prior to the heterogeneous-network handoff; and the second network information field is configured to store a second IP address assigned to the user equipment after the heterogeneous-network handoff.

10. The method of claim 1, wherein the service is a voice over Internet Protocol (VoIP) service and the service server is a VoIP server.

11. The method of claim 1, wherein the first network is a mobile network and the second network is a wireless data network.

12. A method for handoff in a cell supporting heterogeneous networks, within which a user equipment is located, the method comprising:
 providing a service to the user equipment through a service server, the service being provided during a communication session between the service server and the user equipment through an associated service proxy server;
 upon execution of cell-to-cell handoff from a current cell of a first network to a target cell supporting the first network, determining whether the target cell supports heterogeneous networks including a second network based on a physical cell identity associated with the target cell;
 executing a heterogeneous-network handoff, within the target cell, of the communication session from the first network to the second network by turning on a modulation/demodulation of the second network only when the target cell is determined as supporting heterogeneous networks based on the physical cell identity of the target cell, wherein when the physical cell identify is an integrated physical cell identity, the target cell is determined as supporting heterogeneous networks and wherein the integrated physical cell identity indicates an integrated cell supporting a plurality of heterogeneous network types; and
 communicating directly with the service server without the associated service proxy server through by establishing the communication session with the service server by using a mapping table,
 wherein a base station of the target cell is configured to recognize, by using the mapping table, a first IP address allocated to the user equipment for the service prior to execution of the heterogeneous-network handoff, after a second IP address is allocated to the user equipment for the service in place of the first IP address due to the heterogeneous-network handoff, and communicate directly with the service server by using the recognized first IP address.

13. A system for handoff in a target cell supporting heterogeneous networks, the system comprising:
 a user equipment configured to, upon execution of a cell-to-cell handoff in a communication system from a current cell supporting a first network to the target cell supporting heterogeneous networks, determine whether the target cell supports heterogeneous networks including a second network based on a physical cell identity of a base station of the target cell, to determine that the target cell supports heterogeneous network including the second network when the physical cell identity is an integrated physical cell identity, wherein the integrated physical cell identity indicates an integrated cell supporting a plurality of heterogeneous network types, to turn on a network module for establishing access with the second network only when the target cell supports heterogeneous networks including the second network based on the determination, and to execute a heterogeneous-network handoff within the target cell from the first network to the second network; and
 a base station configured to establish a communication session with a service server for providing a service to the user equipment, to communicate directly with the service server through the established communication session by using a mapping table after the heterogeneous-network handoff.

14. The system of claim 13, wherein the user equipment receives physical cell identities from neighboring cells, maintains a white list having information of the neighboring cells and their respective physical cell identities, and selects the target cell based on the received physical cell identities.

15. The system of claim 14, wherein the integrated physical cell identity indicates that the base station of the target cell supports the first network and the second network.

16. The system of claim 15, wherein:
 a respective integrated physical cell identity is allocated to each base station of integrated cells.

17. The system of claim 13, wherein:
 a base station of the target cell has functions of a service proxy server and includes the mapping table;
 the user equipment is allocated with a first IP address for the service prior to execution of the heterogeneous-network handoff and the user equipment is allocated with a second IP address for the service after execution of the heterogeneous-network handoff, and the user equipment receives, after the cell-to-cell handoff, the service directly from the service server through the communication session without utilizing an associated service proxy server; and
 the base station of the target cell recognizes the first IP address of the user equipment, by using the mapping table, after the second IP address is allocated in place of the first IP address due to the heterogeneous-network handoff, and transfers service packets for the service directly to the service server by using the recognized first IP address.

18. The system of claim 13, wherein the mapping table comprises:
 an integrated physical cell identity field that is configured to store an integrated physical cell identity of a corresponding base station;
 a first network information field that is configured to store information on the first network; and
 a second network information field that is configured to store information on the second network.

19. The system of claim 18, wherein:
 the first network information field is configured to store a first IP address assigned to the user equipment prior to the heterogeneous-network handoff; and
 the second network information field is configured to store a second IP address assigned to the user equipment after the heterogeneous-network handoff.

20. The system of claim 18, wherein the first network is a mobile network and the second network is a wireless data network.

* * * * *